(12) United States Patent
Takasu et al.

(10) Patent No.: US 12,123,766 B2
(45) Date of Patent: Oct. 22, 2024

(54) SIGNAL PROCESSING DEVICE, SIGNAL PROCESSING METHOD, AND PROGRAM

(71) Applicant: MITSUBISHI HEAVY INDUSTRIES, LTD., Tokyo (JP)

(72) Inventors: Motoshi Takasu, Yokohama (JP);
Toshifumi Kudo, Tokyo (JP);
Yoshiyuki Hamaji, Yokohama (JP);
Takanori Kouou, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 352 days.

(21) Appl. No.: 17/762,462

(22) PCT Filed: Sep. 25, 2020

(86) PCT No.: PCT/JP2020/036375
§ 371 (c)(1),
(2) Date: Mar. 22, 2022

(87) PCT Pub. No.: WO2021/060500
PCT Pub. Date: Apr. 1, 2021

(65) Prior Publication Data
US 2022/0341772 A1    Oct. 27, 2022

(30) Foreign Application Priority Data
Sep. 27, 2019    (JP) .................. 2019-176601

(51) Int. Cl.
*G01H 3/00*    (2006.01)
*G01H 3/08*    (2006.01)
(Continued)

(52) U.S. Cl.
CPC .......... *G01H 3/08* (2013.01); *G10L 19/0204* (2013.01); *G10L 25/18* (2013.01); *G10L 25/21* (2013.01);
(Continued)

(58) Field of Classification Search
CPC ....... G01H 3/08; G10L 19/0204; G10L 25/18; G10L 25/21; H04R 3/005
See application file for complete search history.

(56) References Cited

U.S. PATENT DOCUMENTS

2002/0198704 A1* 12/2002 Rajan .................... G10L 25/87
704/214
2005/0005199 A1*  1/2005 Yoda ..................... G06F 11/24
714/37

FOREIGN PATENT DOCUMENTS

JP    2003-255971    9/2003
JP    2005-140707    6/2005

OTHER PUBLICATIONS

International Search Report issued Oct. 27, 2020 in International (PCT) Application No. PCT/JP2020/036375, with English translation.

(Continued)

*Primary Examiner* — Rasha S Al Aubaidi
(74) *Attorney, Agent, or Firm* — Wenderoth, Lind & Ponack, L.L.P.

(57) ABSTRACT

This signal processing device comprises: an acquisition unit for acquiring an acoustic signal; a measurement unit for measuring an acoustic level of the acoustic signal for every one of first frequency bands, which are a plurality of frequency bands of a preset first bandwidth; a calculation unit that, on the basis of the plurality of acoustic levels of the first frequency bands, identifies an acoustic feature quantity indicating the separation degree from normal acoustic levels of second frequency bands, which are a plurality of frequency bands of a second bandwidth that is wider than the first bandwidth; a first determination unit for determining whether the acoustic levels measured for every one of the first frequency bands are a first threshold value or greater; and a second determination unit for determining whether the (Continued)

acoustic feature quantity is a second threshold value or greater.

9 Claims, 3 Drawing Sheets

(51) Int. Cl.
    *G10L 19/02*     (2013.01)
    *G10L 25/18*     (2013.01)
    *G10L 25/21*     (2013.01)
    *H04R 3/00*     (2006.01)

(52) U.S. Cl.
    CPC ......... *H04R 3/005* (2013.01); *H04R 2410/01* (2013.01); *H04R 2430/21* (2013.01)

(56) References Cited

OTHER PUBLICATIONS

Written Opinion of the International Searching Authority issued Oct. 27, 2020 in International (PCT) Application No. PCT/JP2020/036375, with English translation.

\* cited by examiner

SIGNAL PROCESSING DEVICE, SIGNAL PROCESSING METHOD, AND PROGRAM

TECHNICAL FIELD

The present disclosure relates to a signal processing device, a signal processing method, and a program.

This application claims the right of priority based on Japanese Patent Application No. 2019-176601 filed with the Japan Patent Office on Sep. 27, 2019, the content of which is incorporated herein by reference.

BACKGROUND ART

PTL 1 discloses voice extraction method and device for performing octave band level analysis of a voice that includes background noise, determining a threshold value, based on an output of a predetermined band in which a difference between the background noise and the voice is large, and extracting the voice from a noise environment by using the threshold value.

PTL 2 discloses a technique that enables extraction of only a frequency component related to a feature sound by separating a signal corresponding to a sound wave into a low frequency component and a high frequency component by wavelet transformation of the signal, extracting a frequency band at the point in a time when the feature sound is not included in the low frequency component, and inputting a signal to a filter of the frequency band.

CITATION LIST

Patent Literature

[PTL 1] Japanese Unexamined Patent Application Publication No. 2003-255971
[PTL 2] Japanese Unexamined Patent Application Publication No. 2005-140707

SUMMARY OF INVENTION

Technical Problem

However, in the voice extraction method disclosed in PTL 1, since the voice is extracted by the octave band analysis, there is a problem in that although the voice does not exceed the threshold value for each band of the octave band, a voice having a difference from the background noise cannot be extracted in a plurality of relevant bands.

Further, in PTL 2, since a sound can be extracted in a case where the feature sound is included in the low frequency component, there is a problem in that a voice cannot be extracted in a case where the feature sound is included in the high frequency component.

The present disclosure has been made to solve the above problems, and has an object to provide a signal processing device, a signal processing method, and a program, in which it is possible to determine whether or not abnormal noise is included in an acquired acoustic signal.

Solution to Problem

A signal processing device according to the present disclosure includes: an acquisition unit that acquires an acoustic signal; a measurement unit that measures an acoustic level of the acoustic signal for each of first frequency bands, which are a plurality of frequency bands related to a first bandwidth set in advance; a calculation unit that specifies an acoustic feature quantity that indicates a degree of deviation from a normal value, of an acoustic level related to each of second frequency bands, which are a plurality of frequency bands related to a second bandwidth wider than the first bandwidth, based on a plurality of acoustic levels related to the first frequency bands; a first determination unit that determines whether or not the acoustic level measured for each of the first frequency bands is equal to or higher than a first threshold value; and a second determination unit that determines whether or not the acoustic feature quantity is equal to or larger than a second threshold value.

A signal processing method according to the present disclosure includes: acquiring an acoustic signal; measuring an acoustic level of the acoustic signal for each of first frequency bands, which are a plurality of frequency bands related to a first bandwidth set in advance; specifying an acoustic feature quantity that indicates a degree of deviation from a normal value, of an acoustic level related to each of second frequency bands, which are a plurality of frequency bands related to a second bandwidth wider than the first bandwidth, based on a plurality of acoustic levels related to the first frequency bands; determining whether or not the acoustic level measured for each of the first frequency bands is equal to or higher than a first threshold value; and determining whether or not the acoustic feature quantity is equal to or larger than a second threshold value.

A program according to the present disclosure causes a computer to function as: an acquisition unit that acquires an acoustic signal; a measurement unit that measures an acoustic level of the acoustic signal for each of first frequency bands, which are a plurality of frequency bands related to a first bandwidth set in advance; a calculation unit that specifies an acoustic feature quantity that indicates a degree of deviation from a normal value, of an acoustic level related to each of second frequency bands, which are a plurality of frequency bands related to a second bandwidth wider than the first bandwidth, based on a plurality of acoustic levels related to the first frequency bands; a first determination unit that determines whether or not the acoustic level measured for each of the first frequency bands is equal to or higher than a first threshold value; and a second determination unit that determines whether or not the acoustic feature quantity is equal to or larger than a second threshold value.

Advantageous Effects of Invention

According to the present disclosure, it is possible to provide a signal processing device, a signal processing method, and a program, in which it is possible to determine whether or not abnormal noise is included in an acquired acoustic signal.

DESCRIPTION OF EMBODIMENTS

First Embodiment

Figure 1:
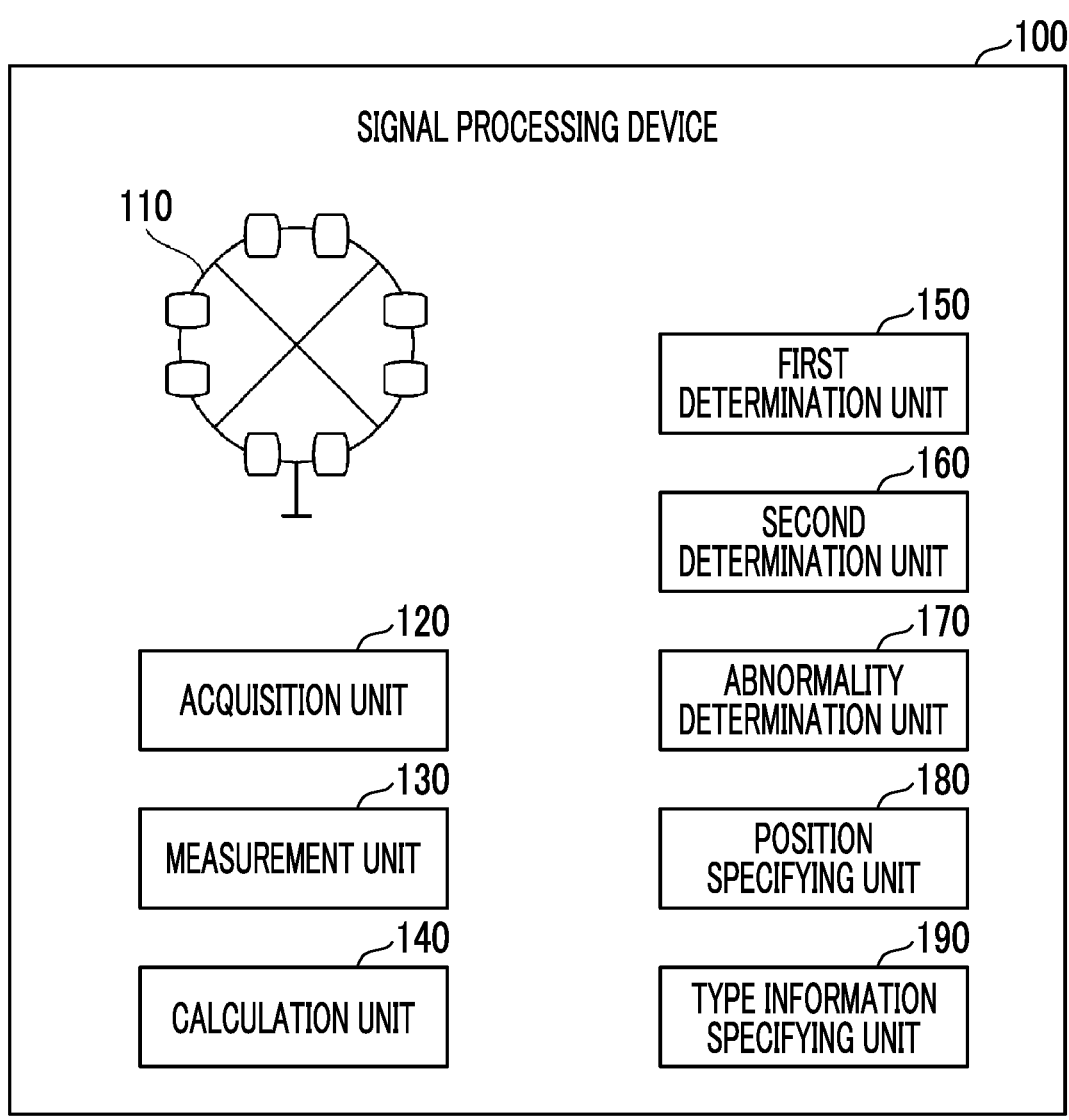
FIG. 1 is a diagram showing a configuration of a signal processing device according to an embodiment of the present disclosure.

Hereinafter, a signal processing device 100 according to a first embodiment will be described with reference to the drawings. The signal processing device 100 according to the first embodiment picks up an acoustic signal of an apparatus to be monitored, such as a plant, and determines whether or not the presence or absence of abnormality of the apparatus to be monitored, based on the acoustic signal.

<<Configuration of Signal Processing Device>>

The signal processing device 100 includes a microphone array 110, an acquisition unit 120, a measurement unit 130, a calculation unit 140, a first determination unit 150, a second determination unit 160, an abnormality determination unit 170, a position specifying unit 180, and a type information specifying unit 190.

The microphone array 110 is a sound collecting device in which a plurality of microphones are arranged in parallel. By using acoustic signals picked up by the plurality of microphones configuring the microphone array 110, it is possible to specify an acoustic signal for each direction. The microphone array includes eight microphones in FIG. 1. However, it may include different numbers of microphones.

The acquisition unit 120 acquires the acoustic signals collected by the microphone array 110. Further, the acquisition unit 120 calculates an acoustic signal for each of a plurality of directions by manipulating and synthesizing the phase and gain of the acquired acoustic signal of each array.

The measurement unit 130 measures a sound pressure level of the acoustic signal acquired by the acquisition unit 120 for each of first frequency bands, which are a plurality of frequency bands related to a first bandwidth set in advance. Further, the measurement unit 130 measures a sound pressure level of each acoustic signal for each of a plurality of directions. The sound pressure level is an example of an acoustic level.

As an example of the first bandwidth, a ⅓ octave can be given. The sound pressure level is a logarithmic value of the amount of sound pressure fluctuation that is included in an acoustic signal.

The measurement unit 130 measures the sound pressure level of the acoustic signal for each of the first frequency bands by specifying sound pressure levels of a plurality of frequencies by Fourier transformation of the acoustic signal acquired by the acquisition unit 120 and taking the maximum value of the sound pressure levels of a plurality of frequencies that are included in the first frequency bands, with respect to each of the first frequency bands.

The calculation unit 140 specifies an acoustic feature quantity related to each of second frequency bands, which are a plurality of frequency bands related to a second bandwidth wider than the first bandwidth, based on the plurality of sound pressure levels related to the first frequency bands. The calculation unit 140 generates, for example, a combined vector, based on the differences between the plurality of sound pressure levels related to the first frequency bands and their normal values, and specifies the length of the combined vector as an acoustic feature quantity.

As an example of the second frequency band, a 4/3 octave can be given. That is, in the first embodiment, four first frequencies related to a ⅓ octave are present in the second frequency band related to a 4/3 octave. That is, the second bandwidth is an integral multiple of the first bandwidth.

The above normal value is the sound pressure level of the acoustic signal that is normally generated in a plant in which the signal processing device 100 is present. The normal value can be obtained, for example, by the average value of the acoustic signals picked up in a normally operating plant, or the like.

In a case where the second frequency band is a 4/3 octave and the first frequency band is ⅓ octave, the calculation unit 140 specifies the acoustic feature quantity as follows.

The calculation unit 140 acquires, in order from the smallest sound pressure level, four sound pressure levels related to the first frequency bands from the measurement unit 130.

The calculation unit 140 performs conversion into a four-dimensional vector whose element is a difference between each sound pressure level and a normal value. The calculation unit 140 specifies the acoustic feature quantity by calculating the Euclidean norm of the converted vector.

The first determination unit 150 determines whether or not at least one sound pressure level other than the sound pressure level related to a third frequency band, which is a frequency band of a normal sound, among the sound pressure levels measured for each of the first frequency bands is equal to or higher than a first threshold value.

As an example of the normal sound, a sound that is normally generated in a plant that is an environment in which the signal processing device 100 is present, and has a frequency in the range of 200 Hz to 2000 Hz cam be given. The third frequency band is a frequency band in which a significant change in sound pressure level is not observed according to the presence or absence of abnormality.

The first threshold value is a plurality of values, and one value among the plurality of values is associated with one first frequency band. The first threshold value may be a plurality of values, and one value among the plurality of values may be associated with one first frequency band or the plurality of first frequency bands. Further, the first threshold value may be one value, and the one value may be associated with all the first frequency bands.

The second determination unit 160 determines whether or not at least one sound pressure level other than the sound pressure level related to the third frequency band, among the acoustic feature quantities specified by the calculation unit 140, is equal to or higher than a second threshold value. The second threshold value related to the acoustic feature quantity is set to a value that is not far from a normal value, as compared with the first threshold value related to the determination of the first determination unit, such that the determination of the second determination unit 160 is more sensitive than the determination of the first determination unit.

The second threshold value is a plurality of values, and one of the sound pressure levels is associated with the second threshold value of one value among the second threshold values of the plurality of values. The second threshold value may be one value, and all the sound pressure levels may be associated with the second threshold value of the one value.

The abnormality determination unit 170 determines that an apparatus to be monitored is abnormal, in a case where it is determined that at least one of the determination of the first determination unit 150 and the determination of the second determination unit 160 is a determination that it is equal to or more than the threshold value. That is, the abnormality determination unit 170 determines that the apparatus to be monitored is abnormal, in a case where the determination of the first determination unit 150 is equal to or more than the first threshold value and the determination of the second determination unit 160 is equal to or less than the second threshold value, a case where the determination of the first determination unit 150 is equal to or less than the first threshold value and the determination of the second determination unit 160 is equal to or more than the second threshold value, and a case where the determination of the first determination unit 150 is equal to or more than the first threshold value and the determination of the second determination unit 160 is equal to or more than the second threshold value.

In a case where the abnormality determination unit 170 determines that the apparatus to be monitored is abnormal, the position specifying unit 180 specifies position information related to the abnormality, based on the direction related to the acoustic signal having the sound pressure level or the acoustic feature quantity exceeding the threshold value. That is, in a case where the abnormality determination unit 170 determines that there is abnormality, the position specifying unit 180 specifies the direction related to the acoustic signal related to the abnormality determination as the direction related to the abnormality.

In a case where the abnormality determination unit 170 determines that the apparatus to be monitored is abnormal, the type information specifying unit 190 specifies the type of the acoustic signal related to the abnormality, based on a frequency band related to a sound pressure level or an acoustic feature quantity exceeding a threshold value. For example, in a case where the abnormality determination unit 170 determines that there is abnormality, the type information specifying unit 190 specifies the type of the acoustic signal related to the abnormality by comparing the frequency of the acoustic signal related to the abnormality with information on the type of the abnormality determined for each frequency band in advance. As an example of the type information, abnormality such as an operation of a safety valve or low-cycle combustion vibration is associated with low frequency sound in the range of 40 Hz to 80 Hz, and abnormality such as a fluctuation of a rotation speed due to slip or the like is associated with beat sound in the range of 100 Hz to 200 Hz. Further, as an example of the type information, abnormality such as the generation of jet sound or the generation of sliding sound is associated with high-frequency sound in the range of 2000 Hz to 4000 Hz, and abnormal noises such as fluid hammer sound of a pipe, machine damaging sound, heat retention or accessory falling sound, or rapid closing sound of a valve or the like is associated with impact sound in the range of 5000 Hz to 10000 Hz.

As an example of the jet sound, sound at the time of air leakage from a pipe or the like, or steam leakage sound that can be recognized to some extent by a human being can be given. As an example of the sliding sound, contact noise between a shaft of a rotary auxiliary machine or the like and a seal portion, or contact noise between the tip of a fan blade and a casing can be given. As an example of the machine damaging sound, sound due to cracking of a machine, sound due to rupture of a machine, or sound due to explosion of a machine can be given.

<<Operation of Signal Processing Device>>

Hereinafter, the operation of the signal processing device 100 will be described with reference to the drawings.

Figure 2:
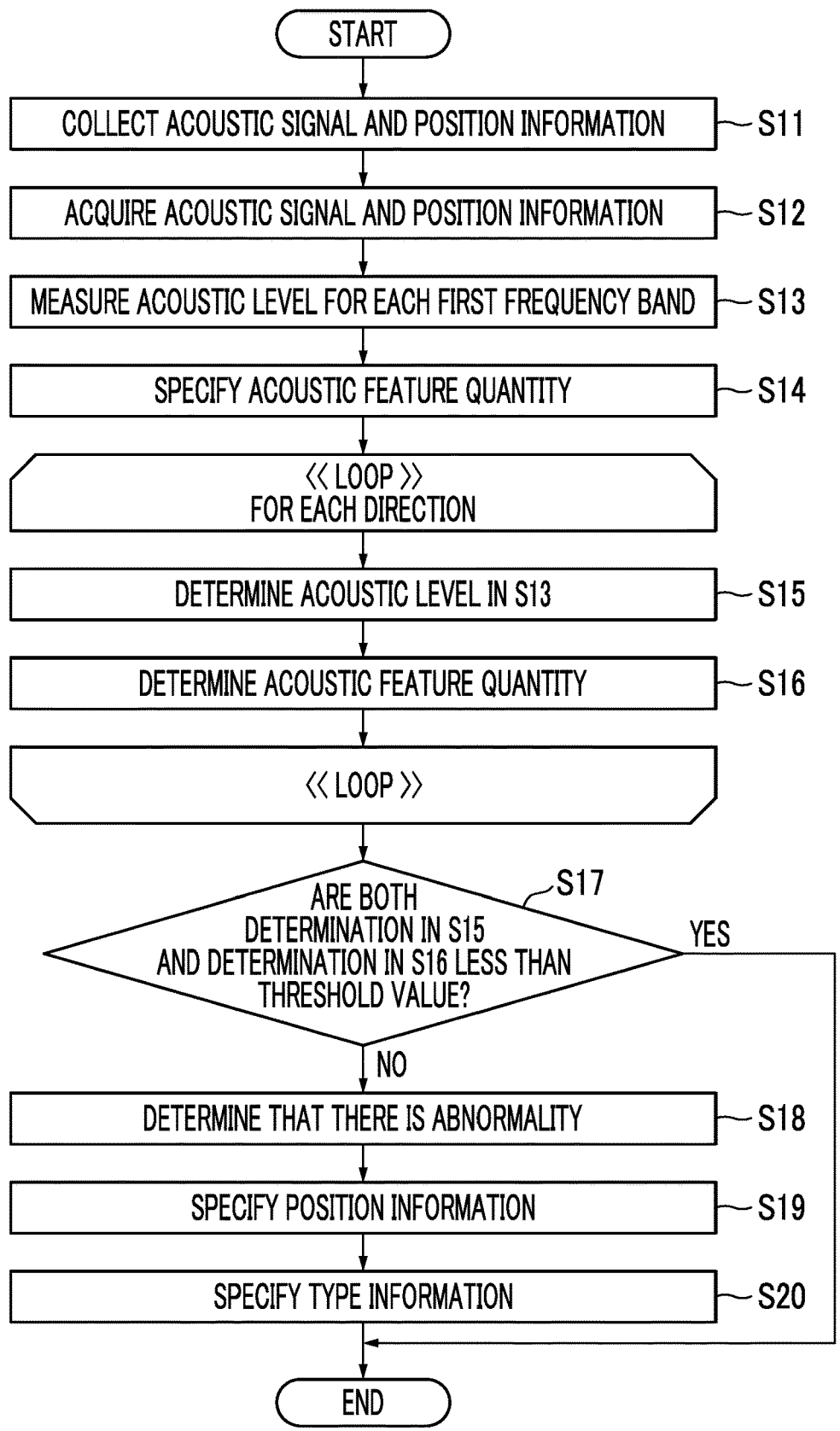
FIG. 2 is a flowchart showing an operation of the signal processing device according to the embodiment of the present disclosure.

FIG. 2 is a flowchart showing the operation of the signal processing device 100.

The microphone array 110 collects acoustic signals from a plant (step S11).

The acquisition unit 120 acquires the acoustic signals collected by the microphone array 110 and generates an acoustic signal for each direction (step S12).

The measurement unit 130 measures a sound pressure level of the acoustic signal acquired in step S12 for each of the first frequency bands which are a plurality of frequency bands related to the first bandwidth set in advance (step S13).

The calculation unit 140 converts a difference between the sound pressure level related to each of the second frequency bands, which are a plurality of frequency bands related to the second bandwidth wider than the first bandwidth, and a normal value, into a vector, based on the plurality of sound pressure levels related to the first frequency bands, and specifies the length of the vector as an acoustic feature quantity (step S14).

The first determination unit 150 determines whether or not at least one sound pressure level other than the sound pressure level related to the third frequency band, which is a frequency band of a normal sound, among the sound pressure levels measured in step S13 is equal to or higher than the first threshold value (step S15).

The second determination unit 160 determines whether or not at least one sound pressure level other than the sound pressure level related to the third frequency band, among the acoustic feature quantities specified by the calculation unit 140, is equal to or higher than the second threshold value (step S16).

The abnormality determination unit 170 determinates whether or not both the determination in S15 and the determination in S16 are less than the threshold value (step S17). In a case where the abnormality determination unit 170 determinates that both the determination in S15 and the determination in S16 are less than the threshold value (step S17: YES), the operation of the signal processing device 100 is ended. On the other hand, in a case where the abnormality determination unit 170 determinates that at least one of the determination in S15 and the determination in S16 is equal to or higher than the threshold value (step S17: NO), the abnormality determination unit 170 determines that there is abnormality (step S18).

In a case where in step S18, it is determined that there is abnormality, the position specifying unit 180 specifies the position information related to the abnormality determining unit 170 (step S19).

In a case where in step S18, it is determined that there is abnormality, the type information specifying unit 190 specifies the type information related to the abnormality (step S20).

Specific Example

Hereinafter, a specific example of the signal processing device 100 according to the first embodiment will be described with reference to the drawings.

Figure 3:
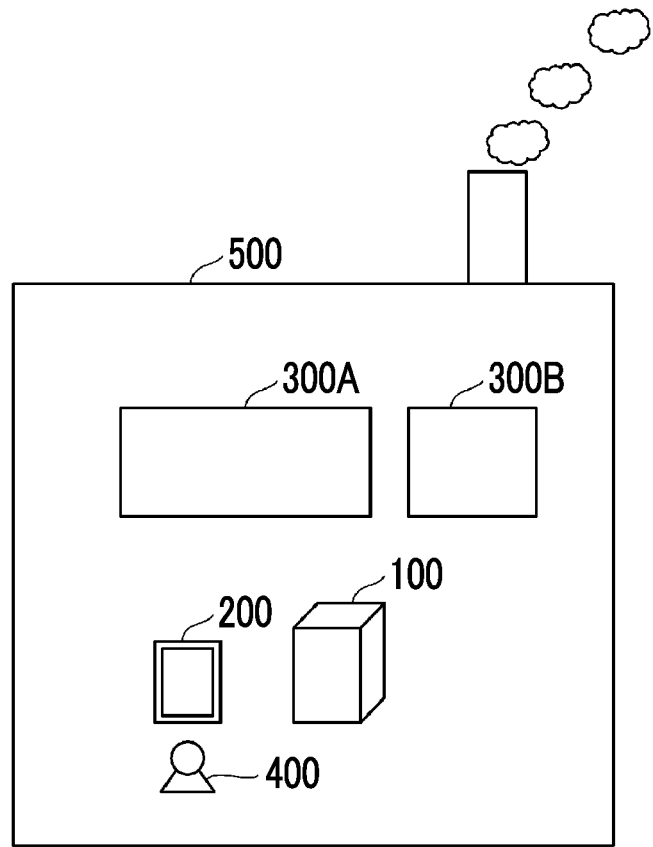
FIG. 3 is a diagram showing a specific example of the signal processing device according to the embodiment of the present disclosure.

FIG. 3 is a diagram showing the specific example of the signal processing device 100 according to the first embodiment.

A display device 200 is a device for displaying the abnormality information, the position information, and the type information determined by the signal processing device 100. As an examples of the display device 200, a display device or a tablet terminal can be given.

A machine 300, which is an apparatus to be monitored, combines objects and generates a constant motion by power, and as a result, performs useful work.

A plant 500 is a facility in which the machine 300 is present and which is involved in the production of an object.

A user 400 acquires acoustic information of the plant 500 and position information related to the acoustic information by using the microphone array 110 of the signal processing device 100. The user 400 acquires an acoustic signal and position information of the plant 500 by using the signal processing device 100 that includes the stationary microphone array 110.

The sound that is normally generated from the plant 500 is a normal sound, and the frequency related to the normal sound is excluded from the determination target of the first determination unit 150 or the second determination unit 160.

In a case where abnormal noise due to a collision between components due to an internal component failure is generated in a state where a machine 300A is in a normal state and a machine 300B is in an abnormal state, the abnormality determination unit 170 of the signal processing device 100 determines that there is abnormality. The user 400 can confirm the abnormality information, the position information, and the type information through the display device 200.

The user 400 can confirm that the machine 300B out of the machine 300A and the machine 300B is related to the abnormality information, based on the position information when an acoustic signal related to the abnormality is picked up and the direction of the acoustic signal related to the abnormality. Further, the user 400 can confirm that the abnormality of the machine 300B is related to impact sound through the type information related to the abnormality information.

<<Operation and Effect>>

The signal processing device 100 according to the present disclosure includes the acquisition unit 120 that acquires an acoustic signal, and the measurement unit 130 that measures an acoustic level of the acoustic signal for each of the first frequency bands, which are a plurality of frequency bands related to the first bandwidth set in advance. Further, the signal processing device 100 includes the calculation unit 140 that specifies an acoustic feature quantity that indicates the degree of deviation from a normal value, of the acoustic level related to each of the second frequency bands, which are a plurality of frequency bands related to the second bandwidth wider than the first bandwidth, based on a plurality of acoustic levels related to the first frequency bands, the first determination unit 150 that determines whether or not the acoustic level measured for each of the first frequency bands is equal to or higher than the first threshold value, and the second determination unit 160 that determines whether or not the acoustic feature quantity is equal to or larger than the second threshold value.

In this way, the signal processing device 100 can determine, among the acquired acoustic signals, abnormal noise having an abnormally high acoustic level in a specific frequency band or abnormal noise related to an acoustic level having a difference from a normal value related to a plurality of frequency bands. Therefore, the user 400 of the signal processing device 100 can determine whether or not abnormal noise is included in the acquired acoustic signal.

The first determination unit 150 of the signal processing device 100 according to the present disclosure determines whether or not each acoustic level outside the third frequency band, which is a frequency band in which there is no significant change in acoustic level according to the presence or absence of abnormality, is equal to or higher than the first threshold value, and the second determination unit 160 determines whether or not the acoustic feature quantity outside the third frequency band is equal to or larger than the second threshold value. In this way, the signal processing device 100 excludes a normal sound which is a sound that is normally generated in an environment in which the signal processing device 100 is present, and determines whether or not abnormal noise is included in the acquired acoustic signal. Therefore, the user 400 of the signal processing device 100 can determine with higher accuracy whether or not abnormal noise is included in the acoustic signal.

The calculation unit 140 of the signal processing device 100 according to the present disclosure specifies the length of a vector generated based on the difference between the acoustic level included in the second frequency band among the plurality of measured acoustic levels and the normal value of the acoustic level, as an acoustic feature quantity. In this way, the signal processing device 100 determines abnormal noise by determining even abnormal noise, in which an acoustic level related to a specific frequency is less than a threshold value, by the length of the total vector of the plurality of acoustic levels. Therefore, the signal processing device 100 can detect more abnormal noise.

The signal processing device 100 according to the present disclosure includes the abnormality determination unit 170 that determines that there is abnormality, in a case where at least one measured acoustic level is equal to or higher than the first threshold value or at least one acoustic feature quantity is equal to or larger than the second threshold value. In this way, the user 400 of the signal processing device 100 can more easily determinate whether or not abnormal noise is included in the acoustic signal.

The acquisition unit 120 of the signal processing device 100 according to the present disclosure acquires acoustic signals from the microphone array 110. Further, the measurement unit 130 of the signal processing device 100 measures the acoustic level for each of a plurality of directions, based on the acoustic signal of each microphone configuring the microphone array 110, and the first determination unit 150 of the signal processing device 100 determines whether or not the acoustic level for each of a plurality of directions is equal to or higher than the first threshold value. Further, the signal processing device 100 includes the position specifying unit 180 that specifies, in a case where the abnormality determination unit 170 determines that there is abnormality, the position related to the abnormality, based on the direction related to the acoustic level determined to be equal to or higher than the first threshold value.

In this way, the signal processing device 100 also acquires the position information related to the acoustic signal, and can also provide the position information of the acoustic signal related to the abnormality to the user 400. Therefore, the user 400 of the signal processing device 100 can easily grasp the position information related to the abnormality in the acoustic signal.

The acquisition unit 120 of the signal processing device 100 according to the present disclosure acquires an acoustic signal that is generated in a plant. In this way, the user 400 of the signal processing device 100 can determinate the acoustic signal related to abnormality that is generated in the plant 500.

Second Embodiment

<<Configuration of Signal Processing Device>>

The configuration of the signal processing device 100 according to a second embodiment is the same as the configuration of the signal processing device 100 according to the first embodiment.

The calculation unit 140 specifies the length of the vector whose element is the normalized value of the difference between the sound pressure level and the normal value, as the acoustic feature quantity.

As an example of the normalization, a method of dividing the difference between the sound pressure level related to the second frequency band and the normal value by the average sound pressure level of the normal sound for a certain period related to the frequency band, based on a plurality of the sound pressure levels related to the first frequency bands can be given. Further, the calculation unit 140 may use a value optionally set for each frequency band by the user 400, instead of the average sound pressure level of the normal sound.

<<Operation and Effect>>

The calculation unit 140 of the signal processing device 100 according to the present disclosure specifies the length of the vector whose element is the normalized value of the difference between the acoustic level and the normal value, as the acoustic feature quantity. In this way, the signal processing device 100 determines whether or not abnormal noise is included, by using the acoustic feature quantity that reflects an acoustic level that is normally generated for each of the frequency bands. Therefore, the user 400 of the signal processing device 100 can determine with higher accuracy whether or not abnormal noise is included in the acoustic signal.

Other Embodiments

Although embodiments have been described in detail with reference to the drawings, the specific configuration is not limited to the configuration described above, and various design changes and the like can be made.

In a case where it is determined that the acoustic signal and the position information acquired from the microphone array 110 are not abnormal, the signal processing device 100 may acquire more acoustic signals and position information from the microphone array 110 again and determine abnormality. For example, it is determined that the acoustic signal related to the position information in seven directions acquired from the microphone array 110 and the position information are not abnormal, the signal processing device 100 may acquire the acoustic signal related to the position information in nineteen directions acquired from the microphone array 110 and the position information again and determine whether or not there is abnormality.

The calculation unit 140 of the signal processing device 100 may specify the average value of the difference between the acoustic level related to each of the second frequency bands, which are a plurality of frequency bands related to the second bandwidth wider than the first bandwidth and the normal value, as the acoustic feature quantity, based on a plurality of acoustic levels related to the first frequency bands.

The first frequency band of the signal processing device 100 may be not only a ⅓ octave but also a ½ octave or the like. Further, the second frequency band of the signal processing device 100 may be not only a 4/3 octave but also a 1/1 octave or the like.

The signal processing device 100 may not include the abnormality determination unit 170, and may display the results of the determination of the first determination unit 150 and the determination of the second determination unit 160 as a graph on the display device 200.

Further, the signal processing device 100 may be configured not to include the microphone array 110 but to include a microphone. In this case, the signal processing device 100 that includes the microphone may be a stationary device or may be a device that can be carried by the user 400.

<Computer Configuration>

Figure 4:
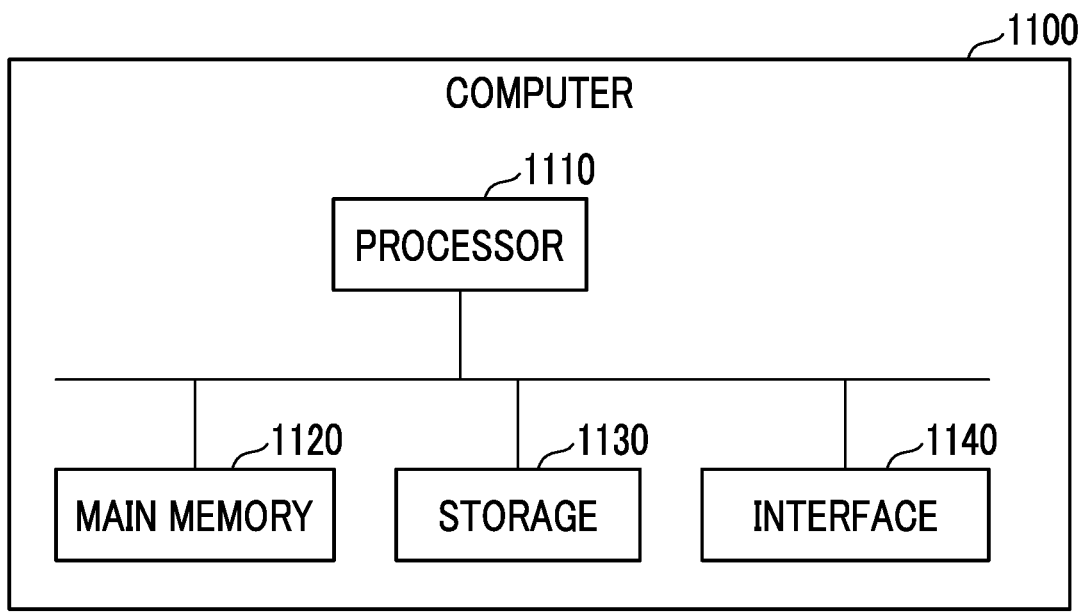
FIG. 4 is a schematic block diagram showing a configuration of a computer according to at least one embodiment.

FIG. 4 is a schematic block diagram showing the configuration of a computer according to at least one embodiment.

A computer 1100 includes a processor 1110, a main memory 1120, a storage 1130, and an interface 1140.

The signal processing device 100 described above is mounted on the computer 1100. Then, the operation of each of the processing units described above is stored in the storage 1130 in the form of a program. The processor 1110 reads the program from the storage 1130, develops it to the main memory 1120, and executes the above processing according to the program. Further, the processor 1110 secures a storage area corresponding to each storage unit described above in the main memory 1120 according to the program.

The program may be intended to realize some of the functions that are executed by the computer 1100. For example, the program may execute a function in combination with another program already stored in the storage 1130, or in combination with another program mounted on another device. In another embodiment, the computer 1100 may include a custom LSI (Large Scale Integrated Circuit) such as a PLD (Programmable Logic Device), in addition to or in instead of the above configuration. As an example of the PLD, PAL (Programmable Array Logic), GAL (Generic Array Logic), CPLD (Complex Programmable Logic Device), or FPGA (Field Programmable Gate Array) can be given. In this case, some or all of the functions that are realized by the processor 1110 may be realized by the integrated circuit.

As an example of the storage 1130, a magnetic disk, a magneto-optical disk, a semiconductor memory, or the like can be given. The storage 1130 may be an internal medium directly connected to a bus of the computer 1100, or may be an external medium connected to the computer through the interface 1140 or a communication line.

Further, in a case where this program is distributed to the computer 1100 through a communication line, the computer 1100 which has received the distribution may develop the program to the main memory 1120 and execute the above processing. In at least one embodiment, the storage 1130 is a non-temporary type of storage medium.

Further, the program may be for realizing some of the functions described above. Further, the program may be a so-called difference file (difference program) that realizes the functions described above in combination with another program already stored in the storage 1130.

<Additional Remark>

The signal processing device 100 described in each embodiment is grasped as follows, for example.

(1) The signal processing device 100 according to a first aspect includes: the acquisition unit 120 that acquires an acoustic signal; the measurement unit 130 that measures an acoustic level of the acoustic signal for each of the first frequency bands, which are a plurality of frequency bands related to the first bandwidth set in advance; the calculation unit 140 that specifies an acoustic feature quantity that indicates the degree of deviation from a normal value, of an acoustic level related to each of the second frequency bands, which are a plurality of frequency bands related to the second bandwidth wider than the first bandwidth, based on a plurality of acoustic levels related to the first frequency bands; the first determination unit 150 that determines whether or not the acoustic level measured for each of the first frequency bands is equal to or higher than the first threshold value; and the second determination unit 160 that determines whether or not the acoustic feature quantity is equal to or larger than the second threshold value.

The acquisition unit 120 of the signal processing device 100 acquires an acoustic signal. Further, the measurement unit 130 of the signal processing device 100 performs Fourier transformation on the acoustic signal and measures the acoustic level for each of the first frequency bands. The calculation unit 140 of the signal processing device 100 specifies an acoustic feature quantity, based on the acoustic level measured by the measurement unit 130. The first determination unit 150 of the signal processing device 100 determines whether or not abnormal noise is included in the acoustic signal, by using the acoustic level measured by the measurement unit 130. The second determination unit 160 of the signal processing device 100 determines whether or not abnormal noise is included in the acoustic signal, by using the acoustic feature quantity specified by the calculation unit 140.

(2) The first determination unit 150 of the signal processing device 100 according to the first aspect determines whether or not each acoustic level outside the third frequency band, which is a frequency band in which there is no significant change in acoustic level according to the presence or absence of abnormality, is equal to or higher than the first threshold value. The second determination unit 160 of the signal processing device 100 determines whether or not the acoustic feature quantity outside the third frequency band is equal to or larger than the second threshold value.

The signal processing device 100 excludes a normal sound which is a sound that is normally generated in an environment in which the signal processing device 100 is present, and determines whether or not abnormal noise is included in the acquired acoustic signal.

(3) The calculation unit 140 of the signal processing device 100 according to the first aspect specifies the length of a vector generated based on a difference between an acoustic level that is included in the second frequency band, among the plurality of measured acoustic levels, and a normal value of the acoustic level, as an acoustic feature quantity.

The signal processing device 100 determines abnormal noise by performing a determination, based on the length of the total vector of a plurality of acoustic levels related to a specific frequency.

(4) The signal processing device 100 according to the first aspect further includes the abnormality determination unit 170 that determines that there is abnormality, in a case where at least one measured acoustic level is equal to or higher than the first threshold value, or at least one acoustic feature quantity is equal to or larger than the second threshold value.

The user 400 of the signal processing device 100 determines whether or not abnormal noise is included in the acoustic signal.

(5) The acquisition unit 120 of the signal processing device 100 according to the first aspect acquires acoustic signals from the microphone array 110. Further, the measurement unit 130 of the signal processing device 100 measures the acoustic level for each of a plurality of directions, based on the acoustic signal of each microphone configuring the microphone array 110, and the first determination unit 150 of the signal processing device 100 determines whether or not the acoustic level for each of a plurality of directions is equal to or higher than the first threshold value. Further, the signal processing device 100 includes the position specifying unit 180 that specifies, in a case where the abnormality determination unit 170 determines that there is abnormality, the position related to the abnormality, based on the direction related to the acoustic level determined to be equal to or higher than the first threshold value.

The signal processing device 100 also acquires the position information related to the acoustic signal, and also provides the position information of the acoustic signal related to abnormality to the user 400.

(6) The acquisition unit 120 of the signal processing device 100 according to the first aspect acquires an acoustic signal that is generated in a plant.

The user 400 of the signal processing device 100 determinates an acoustic signal related to the abnormality that is generated in the plant 500.

(7) The calculation unit 140 of the signal processing device 100 according to a second aspect specifies the length of a vector whose element is the normalized value of the difference between the acoustic level and the normal value, as an acoustic feature quantity.

The signal processing device 100 determines whether or not abnormal noise is included, by using the acoustic feature quantity that reflects an acoustic level that is normally generated for each frequency band.

(8) A signal processing method includes: acquiring an acoustic signal; measuring an acoustic level of the acoustic signal for each of the first frequency bands, which are a plurality of frequency bands related to the first bandwidth set in advance; specifying an acoustic feature quantity that indicates the degree of deviation from a normal value, of an acoustic level related to each of the second frequency bands, which are a plurality of frequency bands related to the second bandwidth wider than the first bandwidth, based on a plurality of acoustic levels related to the first frequency bands; determining whether or not the acoustic level measured for each first frequency band is equal to or higher than the first threshold value; and determining whether or not the acoustic feature quantity is equal to or larger than the second threshold value.

In the signal processing method, an acoustic signal is acquired, the acoustic signal is subjected to Fourier transformation, and the acoustic level for each of the first frequency bands is measured. Further, in the signal processing method, an acoustic feature quantity is specified based on the acoustic level, and whether or not abnormal noise is included in the acoustic signal is determined by using the acoustic level. In the signal processing method, whether or not abnormal noise is included in the acoustic signal is determined by using the acoustic feature quantity.

(9) A program causes a computer to function as: an acquisition unit that acquires an acoustic signal; a measurement unit that measures an acoustic level of the acoustic signal for each of the first frequency bands, which are a plurality of frequency bands related to the first bandwidth set in advance; a calculation unit that specifies an acoustic feature quantity that indicates the degree of deviation from a normal value, of an acoustic level related to each of the second frequency bands, which are a plurality of frequency bands related to the second bandwidth wider than the first bandwidth, based on a plurality of acoustic levels related to the first frequency bands; a first determination unit that determines whether or not the acoustic level measured for each first frequency band is equal to or higher than the first threshold value; and a second determination unit that determines whether or not the acoustic feature quantity is equal to or larger than the second threshold value.

In the program, an acoustic signal is acquired, the acoustic signal is subjected to Fourier transformation, and the acoustic level for each first frequency band is measured. Further, in the program, an acoustic feature quantity is specified based on the acoustic level, and whether or not abnormal noise is included in the acoustic signal is determined by using the acoustic level. In the program, whether or not abnormal noise is included in the acoustic signal is determined by using the acoustic feature quantity.

As an example of the first bandwidth, a ⅓ octave can be given. The acoustic level is an acoustic power level of an acoustic signal. The normal value can be obtained, for example, by the average value of the acoustic signals picked up in a normally operating plant, or the like.

INDUSTRIAL APPLICABILITY

According to the present disclosure, it is possible to provide a signal processing device, a signal processing method, and a program, in which it is possible to determine whether or not abnormal noise is included in an acquired acoustic signal.

REFERENCE SIGNS LIST

100: signal processing device
110: microphone array
120: acquisition unit
130: measurement unit
140: calculation unit
150: first determination unit
160: second determination unit
170: abnormality determination unit
180: position specifying unit
190: type information specifying unit
200: display device
300: machine
400: user
500: plant
1100: computer
1110: processor
1120: main memory
1130: storage
1140: interface

The invention claimed is:

1. A signal processing device comprising:
an acquisition unit that acquires an acoustic signal;
a measurement unit that measures an acoustic level of the acoustic signal for each of first frequency bands, which are a plurality of frequency bands related to a first bandwidth set in advance;
a calculation unit that specifies an acoustic feature quantity that indicates a degree of deviation from a normal value, of an acoustic level related to each of second frequency bands, which are a plurality of frequency bands related to a second bandwidth wider than the first bandwidth, based on a plurality of acoustic levels related to the first frequency bands;
a first determination unit that determines whether or not the acoustic level measured for each of the first frequency bands is equal to or higher than a first threshold value; and
a second determination unit that determines whether or not the acoustic feature quantity is equal to or larger than a second threshold value.

2. The signal processing device according to claim 1, wherein the first determination unit determines whether or not each acoustic level outside a third frequency band, which is a frequency band in which there is no significant change in acoustic level according to presence or absence of abnormality, is equal to or higher than the first threshold value, and
the second determination unit determines whether or not an acoustic feature quantity outside the third frequency band is equal to or larger than the second threshold value.

3. The signal processing device according to claim 1, wherein the calculation unit specifies a length of a vector generated based on a difference between an acoustic level that is included in the second frequency band, among the plurality of measured acoustic levels, and a normal value of the acoustic level, as the acoustic feature quantity.

4. The signal processing device according to claim 3, wherein the calculation unit specifies a length of a vector whose element is a normalized value of a difference between the acoustic level and the normal value, as the acoustic feature quantity.

5. The signal processing device according to claim 1, further comprising:
an abnormality determination unit that determines that there is abnormality, in a case where at least one measured acoustic level is equal to or higher than the first threshold value, or at least one acoustic feature quantity is equal to or larger than the second threshold value.

6. The signal processing device according to claim 5, wherein the acquisition unit acquires the acoustic signal from a microphone array,
the measurement unit measures the acoustic level for each of a plurality of directions, based on an acoustic signal of each microphone configuring the microphone array,
the first determination unit determines whether or not the acoustic level for each of a plurality of directions is equal to or higher than the first threshold value, and
the device further comprises a position specifying unit that specifies a position related to the abnormality, based on a direction related to an acoustic level determined to be equal to or higher than the first threshold value, in a case where the abnormality determination unit determines that there is abnormality.

7. The signal processing device according to claim 1, wherein the acquisition unit acquires an acoustic signal that is generated in a plant.

8. A signal processing method comprising:
acquiring an acoustic signal;
measuring an acoustic level of the acoustic signal for each of first frequency bands, which are a plurality of frequency bands related to a first bandwidth set in advance;
specifying an acoustic feature quantity that indicates a degree of deviation from a normal value, of an acoustic level related to each of second frequency bands, which are a plurality of frequency bands related to a second bandwidth wider than the first bandwidth, based on a plurality of acoustic levels related to the first frequency bands;

determining whether or not the acoustic level measured for each of the first frequency bands is equal to or higher than a first threshold value; and determining whether or not the acoustic feature quantity is equal to or larger than a second threshold value.

9. A non-transitory computer readable medium that stores a program for causing a computer to function as:

an acquisition unit that acquires an acoustic signal;

a measurement unit that measures an acoustic level of the acoustic signal for each of first frequency bands, which are a plurality of frequency bands related to a first bandwidth set in advance;

a calculation unit that specifies an acoustic feature quantity that indicates a degree of deviation from a normal value, of an acoustic level related to each of second frequency bands, which are a plurality of frequency bands related to a second bandwidth wider than the first bandwidth, based on a plurality of acoustic levels related to the first frequency bands;

a first determination unit that determines whether or not the acoustic level measured for each of the first frequency bands is equal to or higher than a first threshold value; and a second determination unit that determines whether or not the acoustic feature quantity is equal to or larger than a second threshold value.

* * * * *